United States Patent
Loikkanen et al.

(10) Patent No.: US 8,350,543 B2
(45) Date of Patent: Jan. 8, 2013

(54) CONTROL CIRCUITRY IN A DC/DC CONVERTER FOR ZERO INDUCTOR CURRENT DETECTION

(75) Inventors: Mikko T. Loikkanen, Oulu (FI); Juha O. Hauru, Oulu (FI); Ari Kalevi Väänänen, Oulu (FI)

(73) Assignee: National Semiconductor Corporation, Santa Clara, CA (US)

( * ) Notice: Subject to any disclaimer, the term of this patent is extended or adjusted under 35 U.S.C. 154(b) by 226 days.

(21) Appl. No.: 12/947,501

(22) Filed: Nov. 16, 2010

(65) Prior Publication Data

US 2012/0119715 A1    May 17, 2012

(51) Int. Cl.
*G05F 1/24* (2006.01)
*G05F 1/00* (2006.01)
(52) U.S. Cl. ........................ 323/259; 323/283
(58) Field of Classification Search .................. 323/259, 323/283
See application file for complete search history.

(56) References Cited

U.S. PATENT DOCUMENTS

| | | | | |
|---|---|---|---|---|
| 6,850,039 B2* | 2/2005 | Popescu | ........................ | 320/134 |
| 7,508,175 B2* | 3/2009 | DeWitt et al. | .................. | 323/224 |
| 8,072,195 B2* | 12/2011 | Aan De Stegge et al. | .... | 323/283 |
| 8,198,881 B2* | 6/2012 | Tsukamoto | .................... | 323/259 |
| 2006/0284606 A1* | 12/2006 | Chen et al. | ...................... | 323/259 |
| 2009/0040794 A1* | 2/2009 | Williams | .................... | 363/21.14 |

* cited by examiner

*Primary Examiner* — Jue Zhang
(74) *Attorney, Agent, or Firm* — Wade J. Brady, III; Frederick J. Telecky, Jr.

(57) ABSTRACT

A converter controller for discharge of a coil used in a DC/DC converter including a voltage detector connected to monitor a state of a diode connected between the coil and ground and an offset comparator, having an adjustable offset, for causing a coil discharge path to be interrupted. The comparator is provided with an initial high offset so that for at least a first converter switching period, the coil will have sufficient charge when the coil discharge path is interrupted to cause the diode to become forward biased as determined by the voltage detector. The offset is periodically reduced until the coil is sufficiently discharged so that the diode is not forward biased, with that value of offset being optimum and thus used in subsequent switching periods.

20 Claims, 9 Drawing Sheets

CONTROL CIRCUITRY IN A DC/DC CONVERTER FOR ZERO INDUCTOR CURRENT DETECTION

BACKGROUND OF THE INVENTION

1. Field of the Invention

The present invention relates generally to DC/DC converters and in particular to circuitry for accurately detecting the point at which a current in the converter coil (inductor) is zero.

2. Related Art

Figure 1:
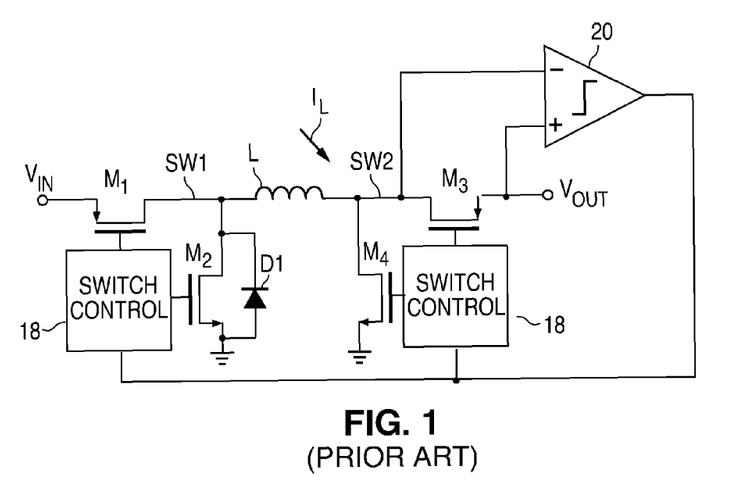
FIG. 1 is a diagram of a portion of the prior art synchronous switching converter capable of buck and boost operation, including circuitry for detecting when the inductor current has been discharged to roughly zero current.

Referring to the drawings, FIG. 1 is a simplified diagram of a prior art DC/DC converter capable of both buck and boost DCM (Discontinuous Conduction Mode) operation and PFM (Pulse Frequency Modulation) operation. Buck operation is used when the input voltage Vin is greater than the regulated output voltage Vout and boost operation is used when the input voltage Vin is less than the regulated output voltage Vout. In a typical application, the input voltage Vin is provided by a battery source, with the battery having a relatively high output voltage compared to Vout when fully charged (hence buck operation) and having a relatively low output voltage compared to Vout when partially discharged (hence boost operation). The regulator is capable of switching from PWM to PFM at low load currents to enhance operating efficiency.

The FIG. 1 regulator utilizes a pair of MOS transistors M1 and M2 primarily for buck operation and another pair of MOS transistors M3 and M4 primarily for boost operation. (All Four Transistors are Used to Some Minor Extent in Both Buck and Boost Operation.) Blocks 18 represent the various well known control circuitry for, among other things, controlling the states of the switches so as to provide the regulated output voltage Vout. The comparator 20 output connected to blocks 18 and is used to control a point at which the coil discharge transistors (M2 or M3 depending upon buck or boost operation) are turned OFF, with the objective being to turn OFF the transistors at zero inductor current. M1 and M3 are P type devices while M2 and M4 are N type devices. In some applications, M2 and M3 are simply diodes but, in order to increase efficiency, transistors M2 and M3 are provided which have a lower voltage drop than a forward biased diode. Thus, M2 and M3 are controlled to emulate diode operation and are often referred to as synchronous rectifiers.

During either buck or boost operation, the coil L is charged during one portion of a switching period and is discharged during a subsequent portion of that switching period. In buck operation, boost transistor M3 is generally maintained ON and boost transistor M4 is maintained OFF. During a first portion of a switching period, transistor M1 is turned ON and M2 is held OFF. This operation causes inductor L (the terms inductor and coil are used interchangeably herein) to begin charging with current IL, with the current linearly increasing at a rate determined by the voltage drop across the inductor (Vin applied to first terminal of the inductor and Vout applied to the second terminal). Once current IL has reached some predetermine peak value in accordance with well known PWM (or PFM) techniques, switches M1 is turned OFF and M2 is turned ON. This will cause the first inductor terminal to switch from Vin to near ground potential and the second terminal to remain at Vout. The inductor L will then begin to discharge in a generally linear manner with the current waveform having a negative slope, with a slope magnitude that again depends upon the voltage difference across the inductor.

In Discontinuous Current Mode (DCM) operation, the inductor current is completely discharged once each switching period. That discharge will be through M2 so as to reduce the inductor current to some value ideally near zero. If switch M2 is turned OFF before the inductor is fully discharged, the inductor will continue to discharge through the now forward biased body diode D1, with D1 being an integral part of the M2 transistor structure. Since the forward voltage drop across D1 is greater the voltage that would have been dropped across the conductive M2, power is wasted in discharging the inductor. This and other factors will result in reduced efficiency. On the other hand, if M2 is switched OFF after the inductor is fully discharged, the direction of inductor current flow will reverse and may actually draw current out of the load by way of M2. This and other factors will again have an adverse effect on efficiency.

One prior art approach (FIG. 1) to increase efficiency is to monitor the output current and attempt to switch M2 OFF exactly when the inductor reaches a full discharge state. A comparator 20 is connected across M3 to provide a control signal to the switch control blocks so as to turn M2 OFF at the appropriate time. In order for this approach to work reasonably well, comparator 20 must be capable of operating at high speed, a requirement which invariably requires large current consumption. In addition, precise control requires that variable system delays be taken into account, with such delays often being a function of variables such as external components and the output voltage magnitude. Note that in boost mode operation, comparator 20 operates to turn OFF discharge transistor M3 for a similar purpose. Once again, there is an issue regarding the accurate turn off of M3.

Thus, there is a need for control circuitry used in a DC/DC converter capable of controlling the turn OFF of the discharging transistor(s) just when inductor is fully discharged, notwithstanding changes is the converter operating conditions, by way of example such as load current, input voltage and output voltage.

DETAILED DESCRIPTION OF THE INVENTION

Figure 2:
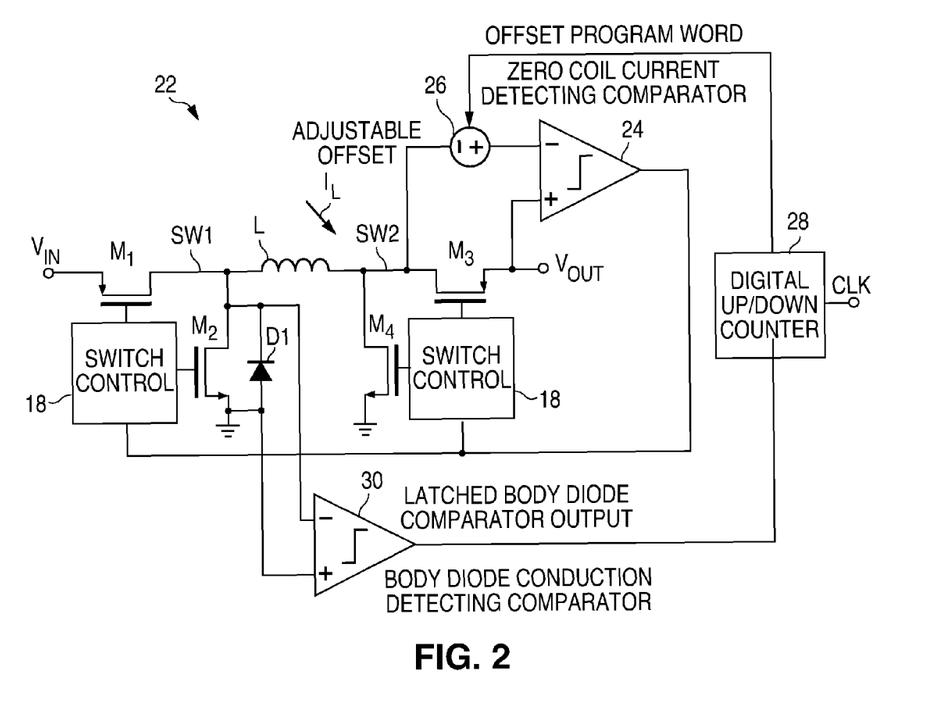
FIG. 2 is diagram of a synchronous switching converter in accordance with one embodiment of the present invention capable of buck and boost operation, including circuitry for more accurately detecting when the inductor current has been discharged to zero current.

Referring again to the drawings, FIG. 2 depicts a DC/DC converter, generally designated by the numeral 22, which includes control circuitry in accordance with one embodiment of the present invention. The converter has roughly the same basic architecture at that of FIG. 1 and includes PMOS transistors M1 and M3 and NMOS transistors M2 and M4. An inductor L is connected intermediate switches M1 and M3, with the output filter capacitor not being depicted. Again, switch control circuitry 18 controls the states of switches M1, M2, M3 and M4 as required to provide both buck and boost operation for both PWM and PFM. With a few minor exceptions which will become apparent from the following description, the circuit details of the switch control blocks 18 are conventional and will not be described so as to avoid obscuring the true nature of the present invention in unnecessary detail.

A zero coil current detecting comparator (ZCCD comparator) 24 is connected across transistor M3 to detect coil discharge current through the transistor. An adjustable offset circuit 26 is connected intermediate the (−) input of comparator 24 and node SW2 (FIG. 2) to adjust the comparator switching point, as will be described. The magnitude of the offset is controlled by the digital output of an up/down counter 28 having a clock input clk. This clock is typically a clock having the same fixed frequency used in PWM operation or having a same variable frequency as used PFM operation. A body diode conduction detecting comparator (BDCD comparator) 30 controls a state of an up/down counter 28, with counter 28 providing a digital output to the adjustable offset circuit 26 to control the magnitude of the offset. Comparator 30 operates to sense the polarity of the voltage across diode D1 and triggers when the voltage polarity tends to forward bias the diode. Preferably the comparator is provided with a few millivolts of offset to provide increased noise immunity so that actual diode conduction is required to trigger the comparator.

Figure 5:
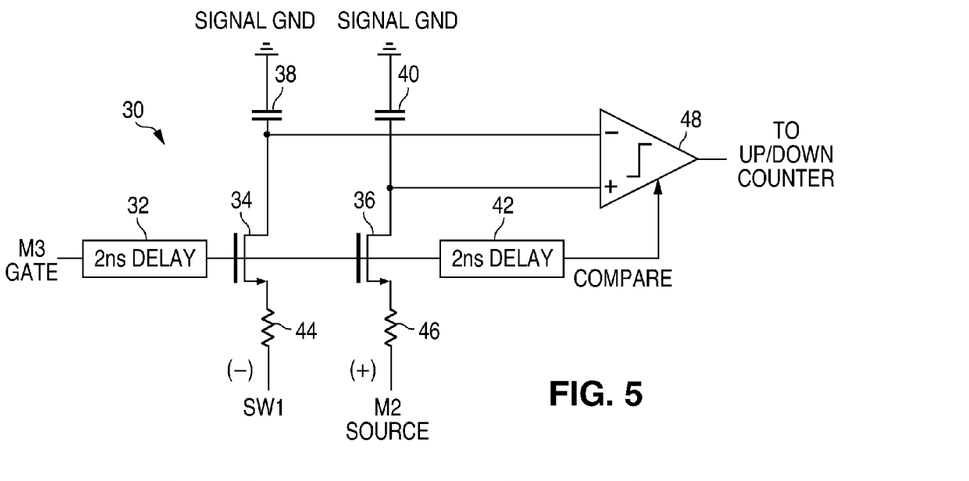
FIG. 5 is a simplified diagram of the body diode conduction comparator (BDC) used in the FIG. 2 converter.

FIG. 5 shows additional details regarding the construction of the BDC comparator 30. As previously described, the (−) input of the comparator is connected to node SW1 which is also the drain of M2 and also the cathode of body diode D1. The (+) input of the comparator is connected to the source (power ground) of M2 which is also the anode of diode D1. A first delay circuit 32 is connected between a control input and the gates of NMOS transistors 34 and 36. Capacitors 38 and 40 are connected between the respective drains of transistors 34 and 36 and signal ground. Signal ground should be separate from the power grounds for transistors M2 and M4 (FIG. 2). The (−) and (+) inputs are connected to the respective sources of transistors 34 and 36 by way of respective resistors 44 and 46.

The input of the delay circuit 32 is the gate drive signal for P type transistor M3 which goes high when M3 is turned OFF. N type transistor M2 is also turned OFF at the same time M3 is turned OFF with this being relevant to buck mode operation, as will be described. The output of the first delay circuit 32 is also connected to the input of a second delay circuit 42, with each delay circuit typically providing a 2 ns delay. The 4 ns delayed signal functions as a strobe input to a comparator 48 having a latched output, with that output controlling the state of the up/down counter 28. As will become apparent, comparator 48 can be a low power, low performance circuit having a substantial input offset voltage. Thus, power consumption is reduced as is circuit complexity.

Figure 6A:
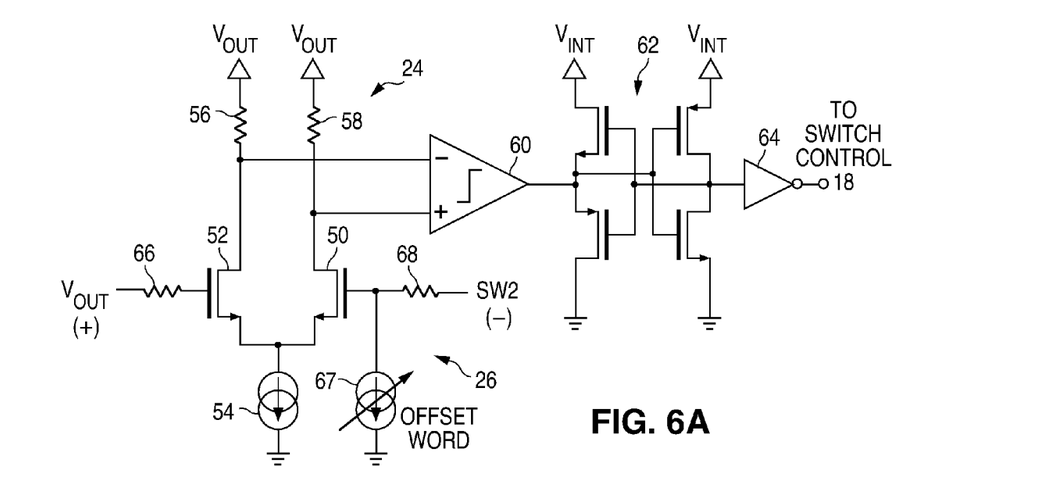
FIG. 6A is a simplified diagram of the zero coil (inductor) current detecting (ZCCD) comparator used in the FIG. 2 converter.

Further details of the ZCCD comparator 24 and adjustable offset circuit 26 are shown in FIG. 6A. Comparator 24 includes a pre-amplification input stage comprising differential transistor pair 50, 52 with their sources coupled to a common tail current source 54. The drains of transistors 50, 52 are connected to respective load resistors 58 and 56, with the pre-amplification stage being powered by the regulated output voltage Vout. The differential output of the pre-amplification stage is fed to a high gain stage 60 preferably implemented in a folded cascode configuration. The single ended output of stage 60 is fed to a current comparator 62 comprising a pair of cross coupled inverter circuits that form a latch.

The output of the current comparator 62 is then fed to a buffer circuit 64, the output of which forms the output of comparator 24, with this output being fed to the switch control blocks 18. As will be explained in greater detail, the signal to the switch control blocks 18 functions to vary the time at which the transistor discharging the coil, such as transistor M2 (FIG. 2), is switched to the OFF state so that it ideally occurs just as the coil is fully discharged.

A first resistor 66 of comparator 24 is connected intermediate the gate of transistor 52 and the (+) input of the comparator, with a second resistor 68 connected intermediate the gate of transistor 50 and the (−) input. A digitally controlled current source 67, which can be implemented in the form of a digital-to-analog converter having a current output, produces an adjustable offset voltage Vos across resistor 68 by drawing an adjustable current through the resistor. This digital input, the offset word, provided to offset adjust circuit 26 is produced by up/down counter 28 (FIG. 2). Thus, the adjustable current source 67 in combination with resistor 68 form the adjustable offset circuit 26 of FIG. 2.

Figure 3:
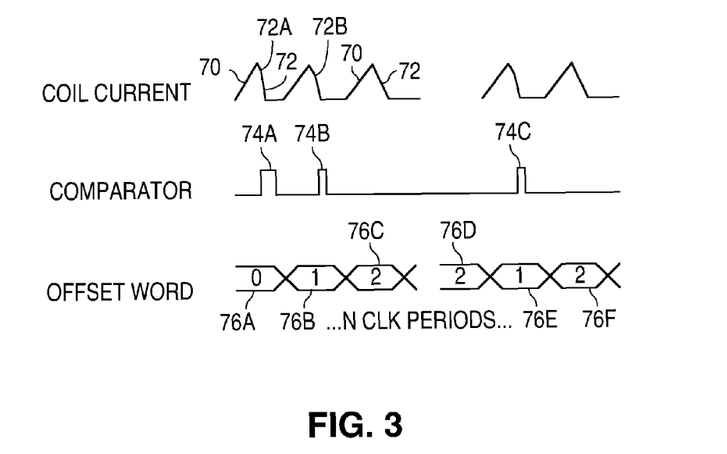
FIG. 3 is a timing diagram illustrating a part of the operation of the FIG. 2 converter.
Figure 4:
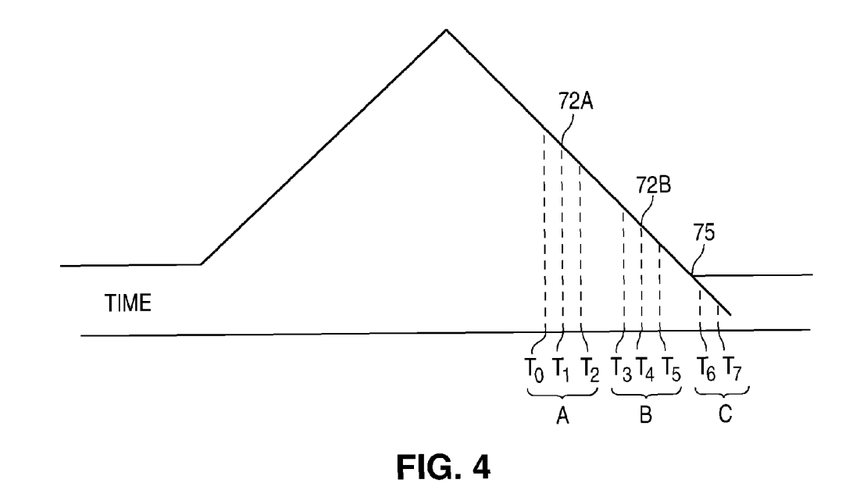
FIG. 4 is a timing diagram showing exemplary coil currents for three consecutive switching periods superimposed over one another.

Having described the construction of the DC/DC converter of FIG. 2, operation will now be described. FIG. 3 is a general timing sequence showing an exemplary coil current waveform, the BDC comparator 30 output and an exemplary digital output (offset word) of the up/down counter 28. The ZCCD comparator output is not depicted. FIG. 4 is a diagram illustrating the coil current over three consecutive switching period superimposed over one another to illustrate the relative timing of certain events within each of the three switching periods. The first, second and third switching period are respectively designated by the letters A, B and C.

As will be explained in greater detail, in the buck operating mode, transistor M1 (FIG. 2) is initially ON and M2 is OFF. This produces a rising coil current level 70 (FIG. 3), with the slope being determined by the difference between Vin and Vout. The state of this current is monitored by the ZCCD comparator 24 connected across transistor M3. At some point in time, the current reach reaches a maximum value determined by the PWM/PFM circuitry. At that point M1 is turned OFF which is rapidly followed by M2 being turned ON. Transistor M2 connects the first terminal of the coil L to ground so that the coil proceeds to discharge, with the slope again being a function of the voltage across the coil (approximately Vout).

Initially, the digital output of up/down counter 28, again referred to as the offset word, is set to provide a maximum offset voltage Vos. This is designated, by way of example as word 0 (designated by numeral identifier 76A of FIG. 3). Thus, the digitally controlled current source 26 (FIG. 6A), which produces an offset voltage Vos across resistor 68, will be near a maximum value. If it is assumed for purposes of illustration that the ZCCD comparator 24 has little intrinsic offset, then essentially all of the offset if provided by the adjustable offset circuit 26. Assuming a relatively high value of offset Vos, ZCCD comparator 24 will trip well before the point at which the coil current is fully discharged. Instead, comparator 24 will trip when the voltage dropped across the current sense impedance of ON transistor M3 is equal in magnitude of Vos. This will occur, for example, at relatively early time T0 (FIG. 4) of the discharge period of the first switching period A of the three switching periods illustrated. After some delay, at time T1 the discharge transistor M2 will be turned OFF by comparator 24. (Note that the relative spacing of the timing points in FIG. 4, time T0 to T1 for example, is exaggerated for purposes of illustration.) As can be seen in the FIG. 4 waveform, the coil is not fully discharged until point 75 so that a substantial charge will still be remaining on the coil at time T1.

Due to the presence of a substantial charge on the coil when switch M2 is turned OFF, the first terminal of the coil L connected to M2 will drop in voltage until the voltage goes sufficiently negative to forward bias the body diode D1. Note that, as will be explained, M3 will be turned OFF at the same time as M2, with the body diode of M3, which is not depicted, also becoming forward biased to complete the path for complete discharge of the coil. The resultant slight increase in voltage across the coil L will cause the slope of the discharge current to increase slightly creating an inflexion point 72A in the FIG. 3 current waveform (not shown in the FIG. 4 waveform). More importantly, the forward biasing of D1 will be detected by the BDC comparator 30 (time T2 of the FIG. 4 waveform) as explained below.

As shown in FIG. 5, the voltages at node SW1 (D1 cathode) and the source of M2 (D1 anode) are sampled 2 ns after the gate voltage of M3 goes high, with this time also coinciding with the turn OFF of M2. The sampled voltages are held momentarily on capacitors 38 and 40. 2 ns later, comparator 48 is strobed so that the held D1 anode voltage is applied to the (+) input of comparator 48 and the held D1 cathode voltage is applied to the (−) input are actually compared. Since the anode voltage is greater than the cathode voltage by one diode D1 voltage drop, the output of comparator 48 will change state when it is strobed and will hold that output until reset at the beginning of the next switching period. This differential sensing of the diode voltage provides reliable and accurate operation, even in the presence on noise. The change in BDC comparator 30 state is depicted by waveform 74A of FIG. 3.

The high output of BCD comparator 30 causes the up/down counter 28 (FIG. 2) to be in the count up mode. Thus, clock clk will cause counter 28 to increment, changing the offset word from 0 (76A of FIG. 3) to 1 (76B of FIG. 3). This will cause the offset voltage Vos to decrease by one step for use in the next switching period.

During the next switching period B (FIG. 4), the decreased value of offset voltage Vos will effectively delay the time within the discharge phase as which the ZCCD comparator 24 is tripped. In other words, rather than being tripped at time T0 as in the initial switching period A, the comparator is tripped at time T3 in the second switching period B. This again causes transistor M2 to be turned OFF, at time T4 during this switching period. Although coil L had a somewhat longer time to discharge during this period, it can be seen form the FIG. 4 waveform that substantial charge remains. Thus, the ZCCD comparator 24 switches state again at time T5 and as shown by waveform 74B of FIG. 3.

The offset word is then increased from 1 to 2 (76C of FIG. 3) so that a new decreased value of Vos is produced. During the third switching period C, ZCCD comparator 24 is tripped at a still later time T6 in the switching period, with this time being shortly after the coil is fully discharged at point 75 of the FIG. 4 waveform. Switch M2 will be shut OFF at time T7, but since the coil contains no significant charge, diode D1 will not tend to be forward biased. As indicated by FIG. 3, BCD comparator 30 does not trip. The present offset word will then be used for the next N number of switching period (or clock periods).

At this point, it is possible that regulator conditions have changed so that the offset word is no longer appropriate. This condition is tested by decreasing the offset word from 2 (76D FIG. 3) to 1 (76E of FIG. 3). This action causes the offset voltage Vos to increase so that the discharge time when M2 is turned OFF is advanced. This will usually cause the BDC comparator 30 to trip during the switching period as indicated by waveform 74C. However, if there had been a very large change in conditions, it may be necessary to decrease the offset word further before the comparator trips. In either case, once on offset word is selected that causes the comparator to trip, the offset word is increase one step to 2 (76F of FIG. 3) which should not result in the BDC comparator BCD 30 being tripped. This new offset word is considered optimal and thus is used for the next N number of switching period.

It can be seen that the size of offset steps in the ZCCD comparator 24 can be reduced so that the time that M2 is turned OFF can be very shortly after the point in time which the coil is fully discharged. However, the smaller step size will increase the number of switching periods needed to arrive at this optimum value so a tradeoffs must be made in selecting the size of the offset steps.

It is important that the anode and cathode voltages of body diode D1 are sampled by the BCD comparator 30 very soon after M2 is switched Off. However, since these voltages are held on capacitors 38 and 40 for a relatively long period, the performance (speed) of strobed comparator 48 can be modest. By way of example, the delay from time T1 to T2 of FIG. 4 is largely attributable to the delay of comparator 48. However, this size of this delay only determines when the new offset word used in the next switching period is updated so that relatively substantial delays have no adverse effect.

Figure 6B:
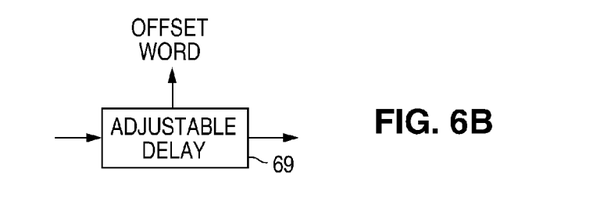
FIG. 6B is an adjustable delay circuit for possible use in the ZCCD comparator of FIG. 6A.

Similarly, a delay in the ZCCD comparator 24 in the monitoring of coil current flow by comparator 24 and turning OFF switch M2 (time T0 to T1 for example) is not critical as long as the delay is relatively fixed for a given offset word. In fact, it would be possible to provide some relatively large fixed value of Vos and then varying the propagation delay through ZCCD comparator 24. The fixed offset voltage Vos could be provided by a fixed current through resistor 68 which corresponds to offset word 0 (FIG. 3). This would cause comparator 24 to start to change state at time T0. The time required to then actually turn switch M2 OFF could be increased in steps by increasing the amount of the delay also in steps based upon the magnitude of the increased offset word. An increase in comparator 24 delay may be provided by way of example, by decreasing the supply current to the comparator with the amount of the delay being a function of the offset word. Alternatively, FIG. 6B shows a digital delay circuit 69 having a propagation delay magnitude controlled by the offset word from counter 28. Circuit 69 could, by way of example, be inserted intermediate current comparator 62 and buffer 64. Other well known methods of providing an adjustable delay could also be used.

Assume for example, the comparator 24 is provided with a relatively large fixed offset voltage Vos. Assuming that comparator 24 has a relatively short associated propagation delay. In that case, comparator 24 will start to change state at time T0 based upon the size of the fixed value of Vos. A short time later due to the sort propagation delay, comparator 24 will actually cause switch M2 to turn OFF at time T1. As previously described, time T1 is sufficiently early in the discharge phase that comparator 30 would sure to trigger, just as indicated by waveform 74A (FIG. 3). The delay of comparator 24 could then be increased one step using the up/down counter 28 so that during the next switching period, comparator 24 again starts to switch at time T0 but the comparator does not switch M2 OFF until time T4 instead of T1. Once again, this will still be too early in the discharge period so that the BCD comparator 30 will trigger. Once again the up/down counter 28 incremented to provide a new offset word to further increase the delay during the next switching period. This time the delay is sufficiently long so that comparator 24 will turn M2 OFF at time T7, with the coil being discharged to a point that comparator 30 will not be triggered. The value of the offset word at this point will then be used for the next N number of switching period as before. After N switching periods the offset word will again be tested to confirm that it remains correct for present operating conditions as previously described.

Thus, the ZCCD comparator 24 offset can be adjusted, by way of example, by using an offset voltage Vos or by altering the propagation delay through the comparator or a combination of both. Stated differently, a comparator offset is considered to be reduced, if the input offset voltage is reduced or if the comparator propagation delay is increased, or a combination of both. In either case, there is an adaptation phase where, during the last switching period of the adaptation phase, the optimum offset word is determined. This is followed by an adopted phase where that optimum offset word is used for N number of additional switching periods.

Figure 7A:
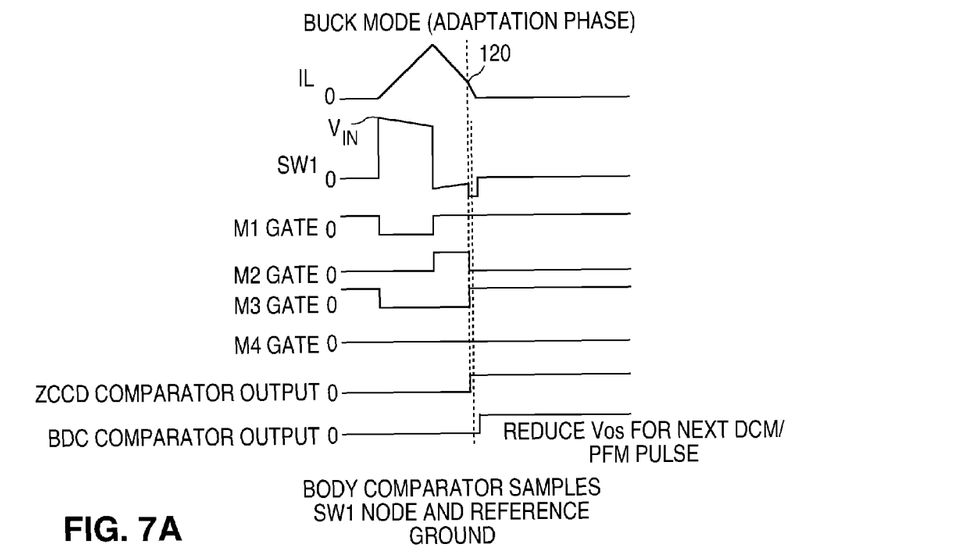
FIGS. 7A and 7B are timing diagrams illustrating the operation of the FIG. 2 converter while in the buck mode for both PWM and PFM.
Figure 7B:
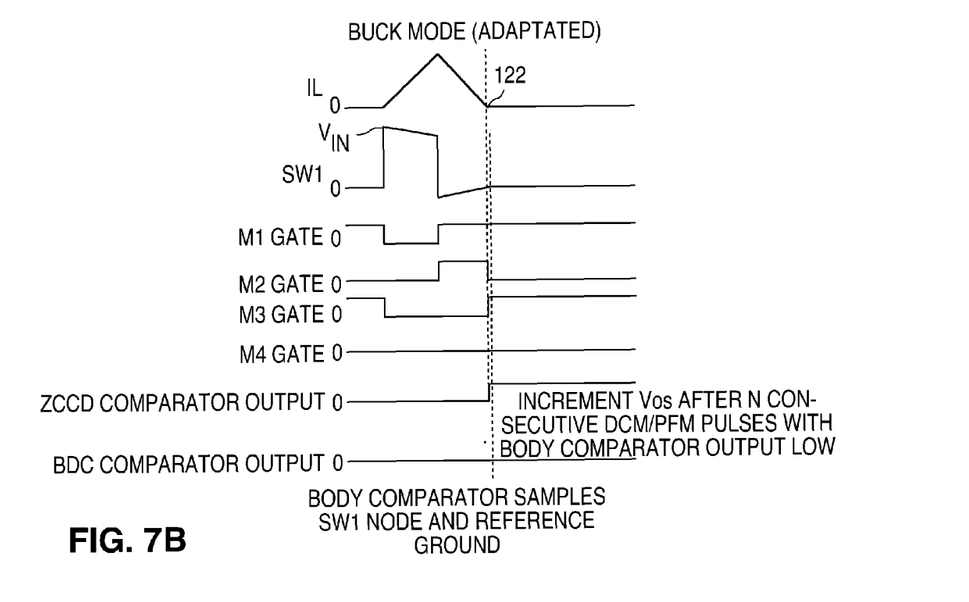

FIG. 7A is a more detailed timing diagram for buck mode operation illustrating the adaptation phase where the appropriate value of the offset word for N cycles of operation is determined. FIG. 7B is a more detailed timing diagram showing buck mode operation illustrating the adapted phase after the appropriate offset word has been determined. Reference will be made to the flow chart of FIG. 8 in explaining the timing diagrams.

Figures 8, 8A:
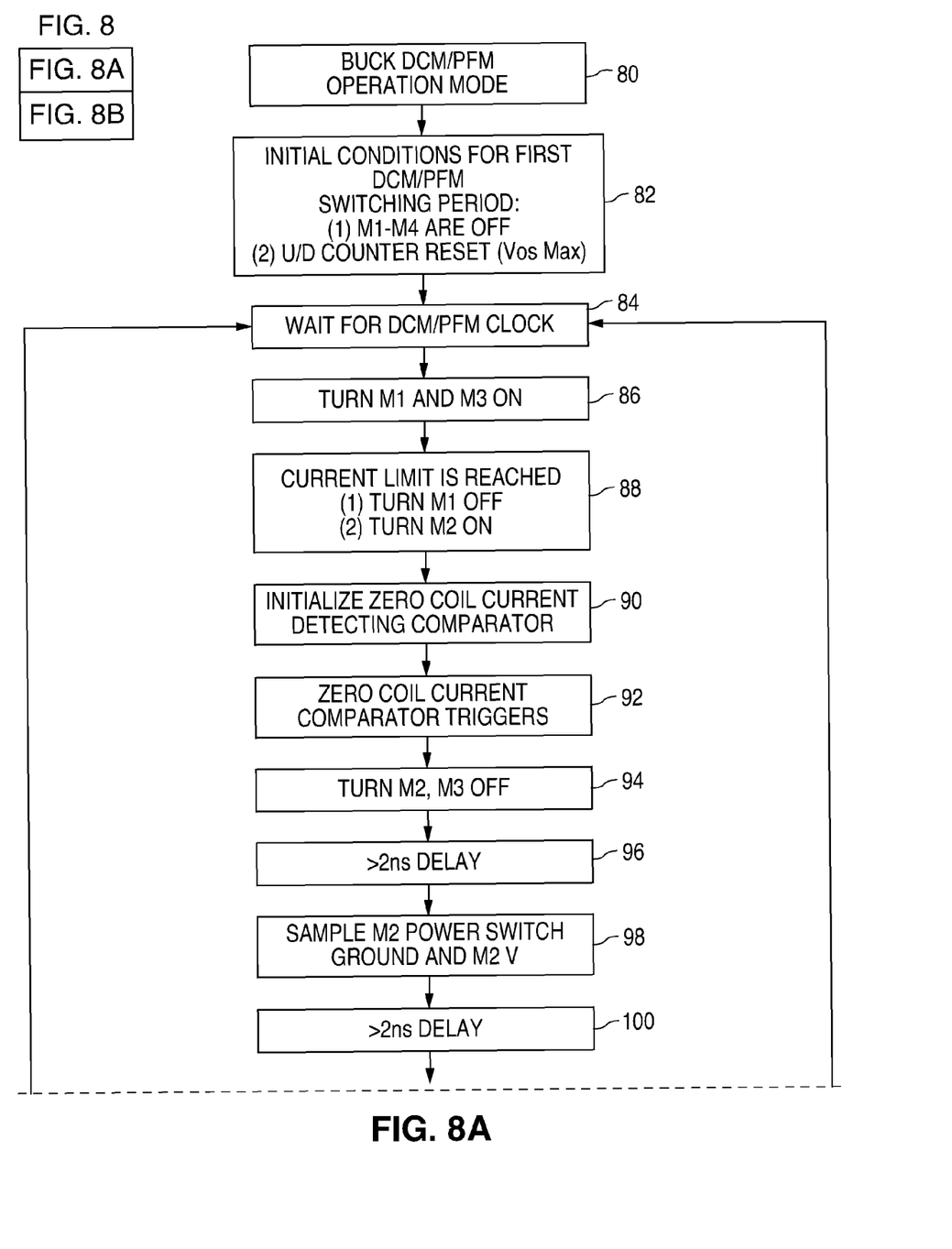
FIGS. 8A and 8B are flow charts further illustrating the operation of the FIG. 2 converter while operating in the buck mode for both DCM and PFM operation.

Referring to block 80 of the FIG. 8 flow chart, the chart depicts buck discontinuous mode (DCM) operation along with buck using pulse frequency modulation (PFM). As previously noted, the DCM operation preferably utilizes a fixed frequency clock clk for clocking counter 28 whereas in PFM applications the clock frequency changes, the variable clock frequency clock is used for clock clk. As indicated by block 82, the initial conditions for the first switching period for buck mode operation are set. Switches M1-M4 are turned OFF and the up/down counter 28 is reset to provide a minimum offset word that corresponds to a maximum offset voltage Vos (or a minimum comparator 24 propagation delay if that approach is to be used). Thus, as indicated by the waveforms of FIG. 7A, the gate voltages of PMOS transistors M1 and M3 are high and the gate voltages of NMOS transistors M2 and M4 are low so that all four transistors are OFF.

The system then waits for the first clock clk as indicated by block 84 which represents the beginning of a switching period. When the clock is received, M1 and M3 are turned ON (block 86) so that coil L starts to charge through the two transistors, with the current ramp having a positive slope proportional to the difference between the input voltage Vin and the output voltage Vout. As can be seen in FIG. 7A, when the current is initially still low, the voltage drop across M1 is small so that the voltage at node SW1 is equal to the input voltage Vin with that voltage dropping slightly as the current through M1 increases.

Eventually, a current limit is reached in accordance with traditional PWM and PFM techniques at which time M1 is turned OFF followed very shortly by turning M2 ON (block 88). As can be seen in FIG. 7A, node SW1 will be then pulled towards ground potential by conductive transistor M2. At this point, the output of ZCCD comparator 24 is initialized (block 90). Prior to initialization, comparator 24 is essentially powered down to conserve power. Upon initialization, the comparator is powered up so that it is operative.

The ZCCD comparator 24, which is connected to monitor current through ON transistor M3, will sense when the coil current has fallen to a predetermined level established by the magnitude of the offset voltage Vos (or comparator 24 propagation delay). As previously noted, Vos is at a maximum value (or comparator propagation delay at a minimum value) due to up/down counter 28 being initially reset to a minimum value. ZCCD comparator 24 will trip at a point determined by the offset word which will then cause transistors M2 and M3 to be turned OFF as indicated in FIG. 7A and block 94 of FIG. 8. (Note that M4 remains OFF during buck operation.) At this point, the coil is not close to being discharged therefore the terminal of the coil connected to M2 will go negative in voltage to the point at which body diode D1 becomes forward biased. Thus, diode D1 clamps the coil terminal voltage one diode drop below ground. When M3 is turned OFF, the partially charged coil will also forward bias the body diode (not depicted) of that transistor so that a coil L discharge current path continues to be provided.

At about 2 ns after the gate signal to M3 goes high (block 96 of FIG. 8) and the gate signal to M2 goes low (M2 and M3 OFF), transistors 34 and 36 of the BDC comparator 30 (FIG. 5) are turned ON (block 98) to sample the voltage at node SW1 (diode D1 cathode) and the source voltage of M2 (diode D1 anode/M2 power ground) which will be held on respective capacitors 38 and 40. Given that the coil has not been discharged, the voltages on node SW1 will be less than that on the M2 power ground, with the magnitude being large enough at this point to forward bias diode D1. The change in polarity of node SW1 relative to the power ground is illustrated in the waveform of FIG. 7A, with the increase in voltage across the coil due to the forward biasing of D1 (and the body diode of M3) resulting in an inflexion point 120 in the current waveform. At 2 ns after the two voltages have been sampled (block 100), internal comparator 48 is strobed so that a comparison is then made (block 102), with the output of internal comparator 48 and thus the BDC comparator 30 output going high in view of the polarity of the sampled voltages.

As indicated by element 104 of the FIG. 8 flow chart, given that body diode D1 has been forward biased at this stage of the adaptation phase, the state of up/down counter 28 is examined (element 106) to determine whether the offset word is at a maximum value which corresponds to a minimum offset voltage Vos (or maximum propagation delay). At this point in the adaptation phase, the offset word will be at a minimum value. Thus, counter 28 is incremented (block 108) to produce a new offset word which operates to reduce the offset voltage Vos by some predetermine value (or increase the comparator 24 propagation delay by some predetermined value). Note that in normal operation, the up/down counter 28 offset word should never be at a point where the value of the offset Vos is at some minimum or maximum value except at the beginning of the sequence (block 82). Accordingly, progressing from element 106 to block 110 is an operational anomaly.

The sequence then proceeds from block 108 back to block 84 of the FIG. 8 flow chart where the sequence remains until the next clock clk is received indicating the beginning of a new switching period. Once the clock is received, M1 and M3 are again turned ON (block 86) so that the coil proceeds to be charged. Once the coil current reaches a maximum value as determined by the converter control circuitry, M1 is turned OFF and M2 is turned ON as indicated by block 88. The sequence proceeds as previously described, the new offset word causing the ZCCD comparator 24 to trip later in the switching period where the coil is further discharged. At this point, the coil L is probably still not fully discharged so that the BDC comparator 24 will again trip (element 104 of the flow chart) and the up/down counter 28 again incremented (block 108) to produce a new, increased offset word.

Figure 8B:
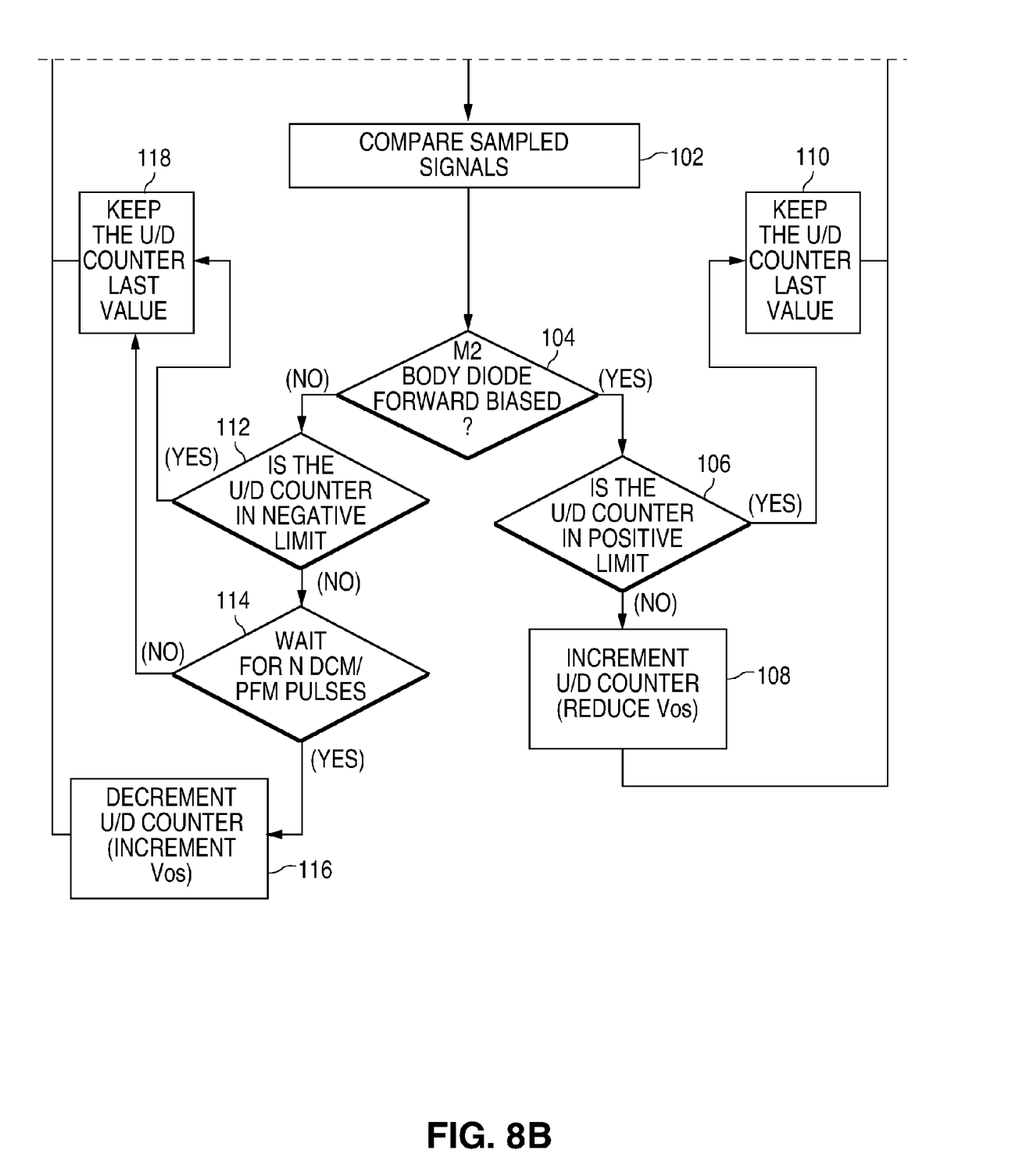

The ZCCD comparator 24, utilizing this new value of offset word, will trip (block 92) at a later point in the coil L discharge and will cause M2 to turn OFF along with M3. The coil is now discharge to a point that any voltage across the body diode D1 is insufficient in polarity and/or magnitude to trip the BDC comparator 30. The sequence will thus proceed to element 112 of the FIG. 8 flow chart where a determination is made as to whether up/down counter 28 is at a negative limit which corresponds to a maximum value of Vos (or a minimum comparator delay). If that is the case, the sequence will proceed to block 118 which indicates that the up/down counter 28 will not be changed and the present offset word is retained. It would be an anomaly to reach this point in the sequence. Instead, the sequence will proceed to element 114. This is the end of the adaptation phase, with the offset word being optimal at this point since the previous smaller offset word produced a comparator offset which caused the comparator 24 to trip one step earlier in the coil discharge phase. This is the end of the adaptation phase of operation and the beginning of the adapted phase of operation.

When the sequence proceeds from element 112 to element 114 a determination is made as to whether or not the optimum offset word has been used for N number of additional consecutive switching periods. At this point that is not the case. The sequence then proceeds back to the beginning of a new switching period (block 84) using the same value offset word (block 118). The sequence will then again control the state of the switches during the new switching period as previously described until a determination of whether or not the body diode has been forward biased (element 104). Since the same offset word was used in the previously switching period discharged the coil adequately to avoid triggering the BDC comparator 30 it is expected that the comparator will not be tripped during the present switching period unless converter conditions have changed since that previous period. Assuming that nothing has changed, the sequence will precede from element 104 though element 112 to element 114. Unless N is set to a very low number, the N number of switching period will not have been reached at this point so that the offset word will be retained and the sequence repeated.

Assuming that converter conditions have not changed, the offset word will be used for first switching period plus N number of additional switching period without triggering the BDC comparator 30. It is however, possible that conditions have changed during the N plus one switching periods such that the comparator 30 does change state. This would indicate that the value of the offset word being used is at least one step too small for current conditions. In that event, the sequence will proceed from element 104, through element 106 to block 108 where the offset word will be increased one step so as to reduce the offset. The new offset word will be then used, and increased again if necessary, unit comparator 30 no longer trips. That new value of then offset word will then be used for an additional N number of switching period (element 113).

It is also possible that the converter conditions are such that offset word becomes too large which means the offset Vos is too small. This condition will result in no triggering of comparator 30 during the N plus one switching periods, the same result as would occur if the offset word were still optimal. In any event, the sequence proceed from element 114 to block 116. At that point, the up/down counter is decremented so the offset word is reduced thereby increasing the magnitude of the offset Vos. Assuming that conditions have not changed too much, during the next switching period comparator 30 should trip indicating that the previous offset word is the new optimum word to be used in the next N number of switching period. On the other hand, if the conditions have changed considerably, the new decreased offset word may still not result in comparator 30 being tripped. In that case, it will be necessary to wait up to N number of additional switching period to correct this condition by decreasing the offset word another step (block 116). This indicates that the value of N should not be made too great since too large of an offset word may not be detected for several switching periods.

For PWM during the exemplary buck mode operation just described, the frequency of the switching period is fixed as is that of clock clk. However, for PFM the clock will vary. The adjustable rate clock clk is used for clocking the up/down counter 28 and for other purposes such as indicated by blocks 84 and element 114 of the FIG. 8 flow chart. FIG. 4 is a waveform that represents the coil current for typical PFM operation.

Figure 9A:
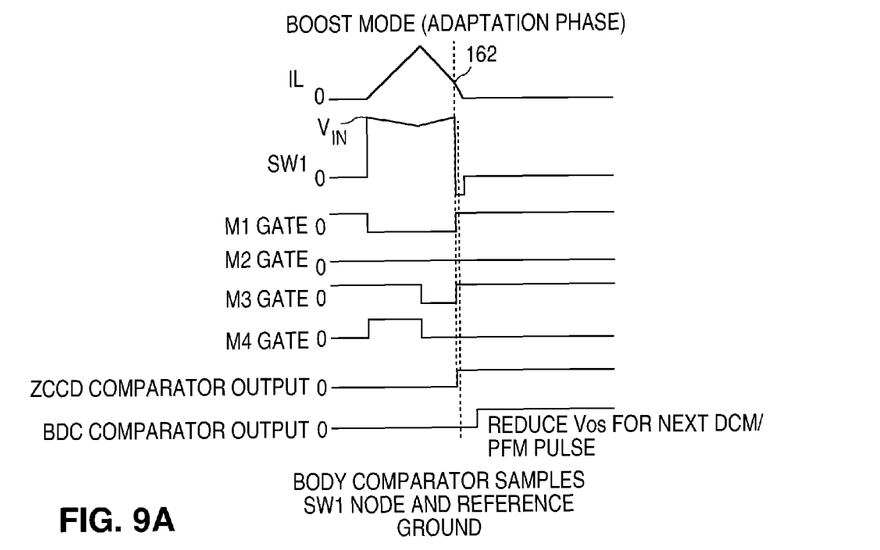
FIGS. 9A and 9B are timing diagrams illustrating the operation of the FIG. 2 converter while operating in the boost mode for both PWM and PFM.
Figure 9B:
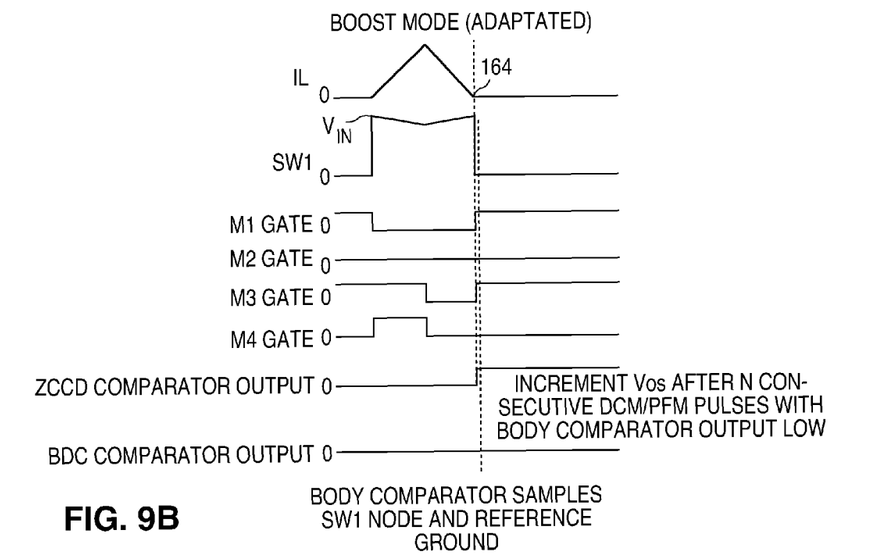
Figures 10, 10A:
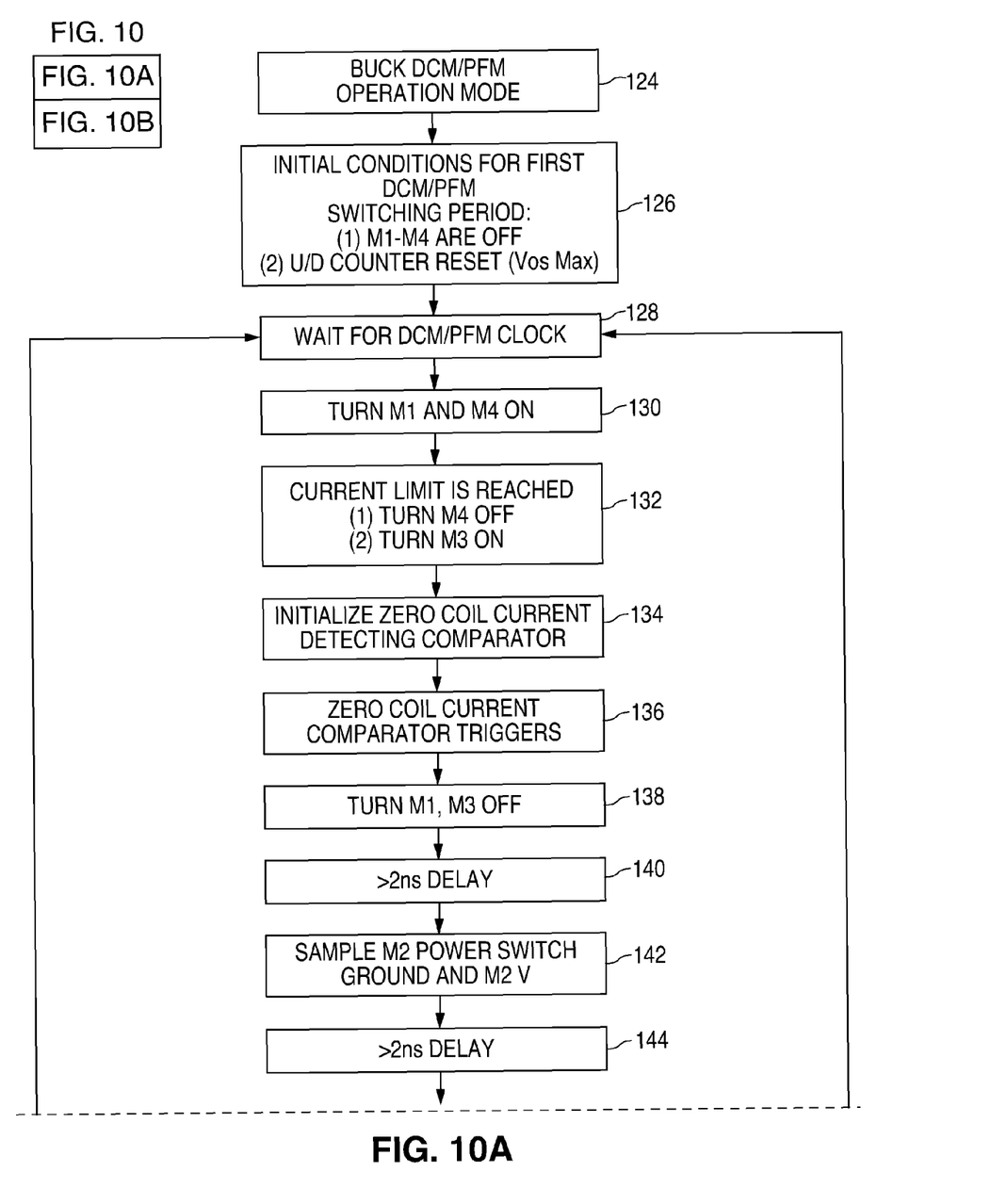
FIGS. 10A and 10B are flow charts further illustrating the operation of the FIG. 2 converter while operating in the boost mode for both PWM and PFM.

FIGS. 9A and 9B are timing diagrams illustrating boost mode operation (Vout>Vin) for the adaptation and adapted phases, respectively. FIG. 10 is a flow chart for boost DCM and PFM operation as indicated by block 124 of the chart. The initial conditions similar to buck operation for the first switching period are that switches M1-M4 are turned OFF (block 126). As indicated by the FIG. 9A timing diagram, transistor M2 will remain OFF throughout boost mode operation. In addition, the offset word of the up/down counter 28 is set to a minimum offset word so as to provide a maximum offset voltage Vos (or minimum comparator 24 delay if that approach is used) as shown by block 128. After the first clock clk is received (block 128) indicating the beginning of a new switching period, transistors M1 and M4 are turned ON (block 130) so that the coil will proceed to charge until the current limit is reached (block 132). At that point, transistor M4 it turned OFF and transistor M3 is turned ON. Since M1 was already ON, the coil L will proceed to be discharged through M3. At this point the ZCCD comparator 24 is initialized (block 134).

The ZCCD comparator 24, which is connected across M3, will monitor the discharge current and will trip (block 136) fairly early in the discharge period due to the maximum Vos (or minimum comparator 24 delay). The triggering of comparator 24 will cause transistors M1 and M3 to turn OFF (block 138). With M1 OFF, the cathode of the body diode D1 of OFF transistor M2 is no longer connected to the Vin terminal. Thus, the terminal of partially charged coil L is free to pull the cathode of D1 below ground so as to forward bias the diode. The body diode (not depicted) of OFF transistor M3 will also be forward biased so that a discharge current path through coil L remains. The forward biasing of the two diodes will change the voltage across the coil as indicated by the inflexion point 162 of FIG. 9A.

As indicated by blocks 140, 142, 144 and 146, BDC comparator 30 operates to sense the polarity of the M2 body diode voltage in the same manner as previously described in connection with buck mode operation. Thus, even though the state of transistor M2 is not controlled in boost mode operation, the voltage across body diode D1 of OFF transistor M2 is still used as an indicator of the charge on coil L. At this point where the offset word is small (Vos is large and/or the comparator delay is small), the BDC comparator 30 will trip (element 148).

Figure 10B:
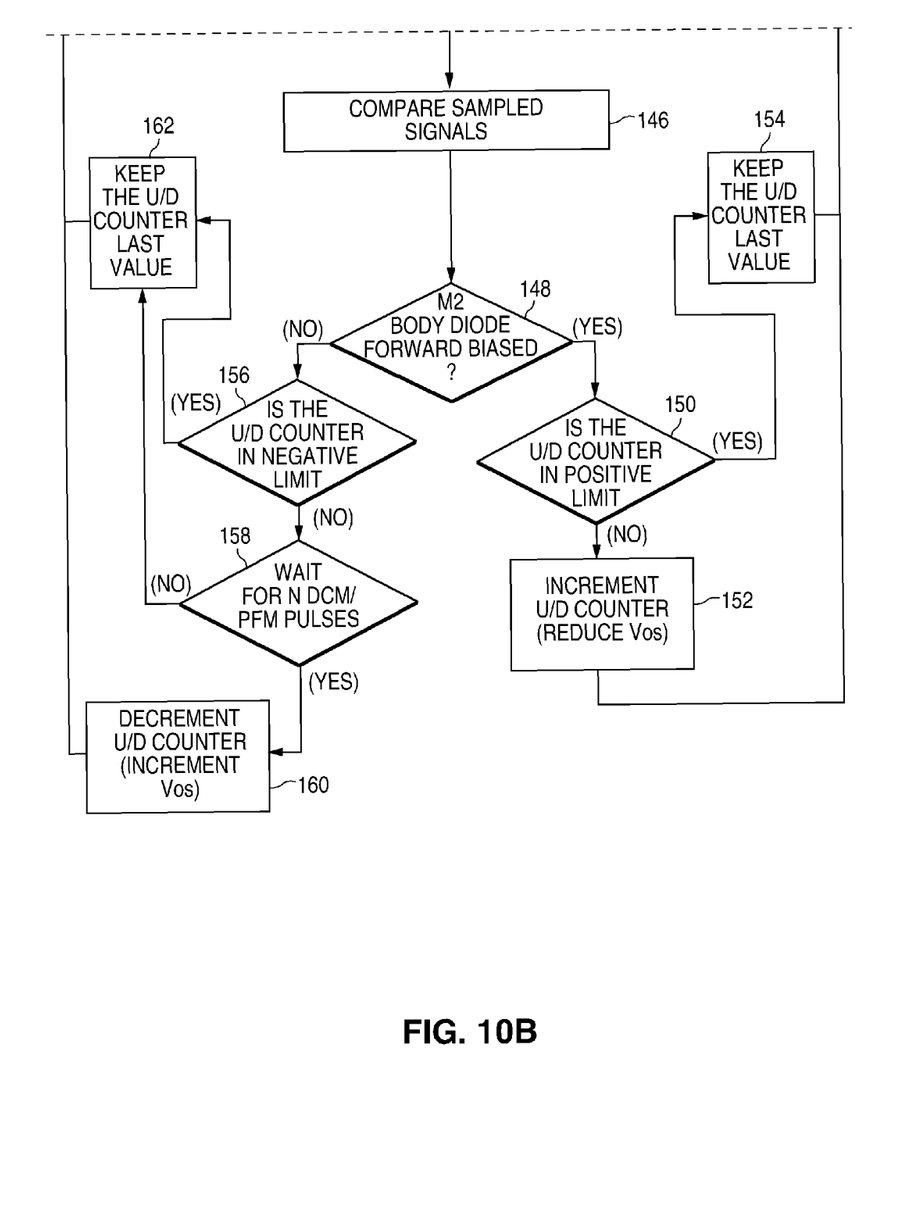

It is then determined (block 150) that the up/down counter 28 is not at its positive limit (Vos at a minimum value or comparator 24 propagation delay at a maximum value). A counter at a maximum value (block 154), would be an anomaly. In any event, the counter 28 is incremented (block 152) due to the state of the output BDC comparator 30 which will reduce the magnitude of the offset voltage Vos by one step (or would increase the delay of ZCCD comparator 24 by one step). Once this has occurred, the circuitry gain awaits the beginning of the next switching period (block 128). This sequence will be repeated, with the offset word being increased once for each switching period until diode D1 is no longer forward biased (block 148). At that point, the sequence will proceed to element 156 and then to element 158. The present offset word value is now optimum for the present operating conditions. This indicates the end of the adaptation phase and the beginning of the adapted phase which is shown in the FIG. 10 flow chart and the FIG. 9B timing diagram.

As in the case of buck operation, in boost operation, the present optimum offset word value will be used for up to N number of switching periods (element 158). If conditions change, there is a process for adjusting the value of the offset word as previously described in connection with the flow chart of FIG. 8 for buck operation.

The selected value of N depends on how quickly the system will vary so as to require a new optimum offset word. N should be at least one with a value of at least twenty being a reasonable choice.

As can be seen from the foregoing, one embodiment of the converter controller insures that the coil L is discharged at the end of each switching period to such an extent that under typical operating conditions, the body diode in at least the majority of the switching periods never become forward biased. In those minority of cases where the body diode does become forward biased, the remaining energy in the coil is still relatively small. Thus, the efficiency of converter operation is enhanced.

Thus, circuitry and methods for enhancing the efficiency of a DC/DC converter is improved. While exemplary embodiments of the invention has been described in some detail, it is to be understood that various changes can be made by those skilled in the relevant art without departing from the spirit and scope of the present invention as defined by the appended claims.

The invention claimed is:

1. A converter controller for use in a DC/DC converter, with the converter including a coil having first and second ends, and a plurality of transistor switches connected to the coil and a diode having a cathode connected to the first end of the coil and an anode connected to a circuit reference, said controller comprising:

a switch controller configured, during a given switching period, to connect at least one of the transistor switches to provide a coil charging path and to connect at least one of the transistor switches to provide a coil discharging path, and wherein the at least one transistor for providing the coil discharging path has a turn OFF time controlled by a turn off signal;

a voltage detector configured to detect a polarity of a voltage across the diode and to produce in response thereto a detector output, including a first detector output when the polarity of the voltage tends to forward bias the body diode and a second detector output when the polarity of the voltage tends to reverse bias the diode;

an offset circuit configured to produce offset outputs, including a first offset output in response to receipt of the first detector output and a second offset output in response to receipt of the second detector output; and an offset comparator configured to monitor a coil discharge current to produce the turn off signal, with the offset comparator having a comparator offset which can be adjusted so that a point at which an output of the offset comparator changes state can be altered in response to utilization of the offset outputs, with the offset comparator forming part of a feedback path; and wherein, in response to utilization of the first offset output by the offset comparator, the turn off signal operates to cause the at least one transistor for providing the coil discharge path to turn OFF at a time such that the voltage detector produces the first detector output and, in response to utilization of the second offset output by the offset comparator, the turn off signal operates to cause the at least one transistor for providing the coil discharge path to turn OFF at a time such that the voltage detector produces the second detector output, with the offset comparator utilizing the first offset output during one switching period and utilizing the second output offset output during a next switching period and during N number of subsequent switching periods that are consecutive with respect to the next switching period, where N is at least one.

2. The converter controller of claim 1 wherein the plurality of transistor switches of the converter includes a first transistor switch connected intermediate the first end of the coil and a converter input terminal and a second transistor switch connected intermediate the first end of the coil and the circuit reference, with the second transistor switch including the diode as a body diode and wherein the switch controller is further configured, during a given switching period, to turn the first transistor switch ON to form at least part of the charging path and to turn the second transistor switch ON to form at least part of the discharging path and wherein the second transistor switch has the turn OFF time controlled by the turn off signal.

3. The converter controller of claim 2 wherein the plurality of transistor switches of the converter further includes a third transistor switch connected intermediate the second end of the coil and a converter output terminal and a fourth transistor switch connected intermediate the second end of the coil and the circuit reference, and wherein the switch controller is further configured, during a given switching period, to turn the third transistor ON to form at least part of the discharging path and to turn the fourth transistor switch ON to form at least part of the charging path.

4. The converter controller of claim 1 wherein the offset outputs are produced in a digital form and wherein the value of N is at least twenty.

5. The converter controller of claim 4 wherein the offset circuit includes an up/down counter, with an output of the up/down counter forming the offset outputs.

6. The converter controller of claim 5 wherein the up/down counter counts in response to a clock signal, with a counter up/down state being controlled by the detector output.

7. The converter controller of claim 6 wherein the switching periods and the clock have a same constant period.

8. The converter controller of claim 6 wherein the switching periods and the clock have a same variable period.

9. The converter controller of claim 2 wherein the offset circuit will operate to cause the offset comparator to turn the second transistor switch OFF at a relatively early time when the first detector output is present and at a relatively later time when the second detector output is present.

10. The converter controller of claim 1 wherein the offset comparator monitors the coil discharge current by sensing a voltage drop across a current sensing impedance disposed intermediate the second end of the coil and the converter output terminal.

11. The converter controller of claim 1 wherein the voltage detector includes a sample circuit which produces a first sampled voltage relating to the body diode anode voltage and a second sampled voltage relating to the body diode cathode voltage.

12. The converter controller of claim 11 where the voltage detector includes a comparator circuit configured to compare the first and second sampled voltages with one another to produce the voltage detector output.

13. The converter controller of claim 12 wherein the first and second sampled voltages are produced by sampling the respective body diode anode and cathode voltages after the second transistor switch is turned OFF.

14. The converter controller of claim 13 wherein the comparator circuit includes a strobe control input for initiating a comparison, with the strobe control input being triggered after the first and second sampled voltages are produced.

15. The converter controller of claim 14 wherein the comparator circuit includes a latching output which retains the detector outputs after the strobe control input has been triggered.

16. The converter controller of claim 1 wherein the comparator offset is provided, at least in part, by an offset voltage source having a magnitude which can be adjusted in response to the output offsets produced by the offset circuit.

17. The converter controller of claim 1 wherein the comparator offset is provided, at least in part, by a delay adjust circuit which alters a propagation delay of the offset comparator, wherein a magnitude of the propagation delay can be adjusted in response to the output offsets produced by the offset circuit.

18. A method of controlling discharge of a coil used in a DC/DC converter, with the converter including a diode having a cathode connected to one terminal of the coil, an anode connected to a circuit reference and a transistor switch that forms at least part of a discharge path for the coil, said method comprising:
  (a) charging the coil during a switching period;
  (b) commencing a discharge of the coil during the switching period through the transistor;
  (c) turning OFF the transistor at a first point in time in the switching period while discharging the coil and then sampling a voltage across the diode to determine a polarity of the voltage;
  (d) charging the coil during a subsequent switching period immediately following the previous switching period;
  (e) commencing a discharge of the coil during the subsequent switching period through the transistor;
  (f) turning OFF the transistor at a second point in time in the subsequent switching period while discharging the coil, with the second point in time being later in the subsequent switching period than the first point in time in the previous switching period and then sampling the voltage across the diode to determine the polarity of the voltage;
  wherein the first point in time is sufficiently early in the switching period so that the a remaining charge on the coil will produce a voltage having a polarity which will tend to forward bias the diode, and wherein steps (d) through (f) are repeated for subsequent switching periods until the polarity of the voltage reverses in which case the point in time of transistor turn OFF during that switching period of polarity reversal is used as a transistor turn OFF time during a next N number of consecutive of switching periods where N is greater than one.

19. The method of claim 18 wherein changes in transistor turn off time from one switching period to a next switching period are controlled by a digital offset word.

20. The method of claim 19 where the digital offset word is maintained fixed in value for the N number of switching periods, where N is at least twenty, and then the digital offset word is either increased or decreased in value depending upon the polarity of the voltage across the diode.

* * * * *